United States Patent
Al Marri

(10) Patent No.: US 9,426,297 B1
(45) Date of Patent: Aug. 23, 2016

(54) COMMUNICATION DEVICE, CIRCUIT AND METHOD FOR CONFIRMING RECEIPT OF MESSAGES SENT THROUGH UNIDIRECTIONAL COMMUNICATION CHANNELS

(71) Applicant: Saqr Majed Saqr Al Marri, Dubai (AE)

(72) Inventor: Saqr Majed Saqr Al Marri, Dubai (AE)

( * ) Notice: Subject to any disclaimer, the term of this patent is extended or adjusted under 35 U.S.C. 154(b) by 9 days.

(21) Appl. No.: 14/623,701

(22) Filed: Feb. 17, 2015

(51) Int. Cl.
*H04M 3/533* (2006.01)
*H04M 3/537* (2006.01)

(52) U.S. Cl.
CPC .............. *H04M 3/533* (2013.01); *H04M 3/537* (2013.01)

(58) Field of Classification Search
CPC .............................. H04M 3/533; H04M 3/537
See application file for complete search history.

(56) References Cited

U.S. PATENT DOCUMENTS

| | | | | | |
|---|---|---|---|---|---|
| 4,092,597 | A * | 5/1978 | Place | ................ | H04W 88/027 340/7.49 |
| 5,809,415 | A * | 9/1998 | Rossmann | ............ | E21B 43/121 340/7.21 |
| 6,188,872 | B1 * | 2/2001 | Nagira | .................... | H04L 1/18 370/328 |
| 6,233,320 | B1 * | 5/2001 | Haimi-Cohen | ....... | H04M 1/656 379/88.16 |
| 6,987,841 | B1 * | 1/2006 | Byers | ................ | H04M 3/42221 379/68 |
| 7,136,670 | B1 * | 11/2006 | Ruckart | .............. | H04M 1/7255 379/387.01 |
| 8,055,240 | B2 * | 11/2011 | Kim | ........................ | H04W 4/12 379/100.06 |
| 8,917,833 | B1 * | 12/2014 | Henderson | ............ | H04M 1/656 379/68 |
| 2008/0153531 | A1 * | 6/2008 | O'Shaughnessy | ...... | H04L 67/24 455/518 |
| 2009/0170506 | A1 * | 7/2009 | Hirsch | .................... | H04B 1/74 455/431 |
| 2010/0069043 | A1 * | 3/2010 | Khawand | ................ | H04W 4/16 455/412.1 |
| 2014/0378181 | A1 * | 12/2014 | Larman | ............. | H04M 1/72527 455/550.1 |
| 2015/0173072 | A1 * | 6/2015 | Frederiksen | ........ | H04L 12/1868 370/312 |

* cited by examiner

*Primary Examiner* — Nathan Mitchell
(74) *Attorney, Agent, or Firm* — Hayes Soloway PC

(57) ABSTRACT

An electronic communication device for facilitating communication between one or more remote devices for voice communication over a unidirectional radio communication channel, the device comprising a receiver for receiving an incoming voice message from a first remote device, a speaker for playing the incoming voice message, a microphone for receiving an output to generate an outgoing voice message, a transmitter for sending the outgoing voice message to a second remote device, an indicator to indicate whether the receiver is in a passive mode or an active mode, and a confirmation circuit to be connected to the receiver, the transmitter, the speaker and the indicator for recording the incoming voice message when the receiver is in an active mode, playing the recorded voice message and sending the played voice message to the remote device as a confirmation receipt of the incoming voice message when the receiver is in a passive mode.

23 Claims, 5 Drawing Sheets

COMMUNICATION DEVICE, CIRCUIT AND METHOD FOR CONFIRMING RECEIPT OF MESSAGES SENT THROUGH UNIDIRECTIONAL COMMUNICATION CHANNELS

FIELD OF THE DISCLOSURE

The present disclosure generally relates to the field of radio communication and more specifically to a repeater, electronic circuit and method for confirming receipt of a voice message sent through a unidirectional channel such as a radio communication channel in a walkie/talkie communication system.

BACKGROUND OF THE INVENTION

Traditional walkie/talkie systems do not enable a confirmation of receipt of a voice message. As a result, the user transmitting the voice message cannot confirm that his/her message has been received at the other side. The transmitting user generally relies on a human at the other side of the channel to confirm back to him/her that the message has been received. If no human is at the repeater at the time the voice message is sent, no confirmation is sent back to the transmitting user. The user may think that his voice message has been successfully received at the other end when it has not. This is a limitation in the present state of the art walkie talkie systems.

More specifically, when a voice message is sent by a user over a walkie/talkie channel, it is received by a repeater at the other end of the channel. The problem with existing transmission devices (walkie/talkie) is that when a user sends a voice message, the user does not know if the voice message has been received at the other side of the channel by the receiver.

Therefore, there is a need to implement means by which a confirmation of safe receipt of the message can be given to users in a walkie-talkie system. Further, there is a need to provide a confirmation to the person relaying the voice message so that he/she positively knows that the message has been received, and does not wait for human confirmation from the other end.

SUMMARY OF THE INVENTION

In view of the foregoing disadvantages inherent in the prior-art and the needs as mentioned above, the general purpose of the present disclosure is to provide a system and method for confirming receipt of a message sent through a single frequency channel in walkie/talkie systems that is configured to include all advantages of the prior art and to overcome the drawbacks inherent in the prior art offering some added advantages.

To achieve the above objectives and to fulfill the identified needs, in one aspect, the present disclosure provides a repeater and electronic circuit for confirming receipt of a voice message sent through a single frequency channel in walkie/talkie communication systems.

Specifically, in an embodiment of the invention, the present invention provides an electronic communication device capable of facilitating communication between one or more remote devices for voice communication. The electronic communication device includes at least one receiver for receiving an incoming voice message from a first remote device via radio communication, at least one first speaker connected to the at least one receiver for playing back the incoming voice message, at least one microphone operationally connected to at least one second speaker for receiving an output from the at least one second speaker in order to generate an outgoing voice message, and at least one transmitter connected to the at least one microphone for sending the outgoing voice message to a second remote device.

In an embodiment of the invention, the second remote device is the first remote device from which the message has been received. According to this embodiment, the microphone is operationally connected to the at least one second speaker via a recorder which records the message played by the at least one second speaker before being relayed to the microphone and thereafter to the transmitter for transmitting the message to the first remote device. In another embodiment, the microphone is operationally connected to the at least one first speaker via a delay circuit adapted to time delay the played message before being relayed to the microphone and then to the transmitter for transmission to the first remote device. This is in order to allow the message to be received entirely by the receiver before it is being resent via the transmitter back to the first remote device. This is because the communication channel is a unidirectional communication channel which cannot enable simultaneous bidirectional communication of messages.

Further, the electronic communication device includes at least one indicator connected to the at least one receiver and adapted to provide a passive mode signal when the at least one receiver is in a passive mode, and to provide an active mode signal when the at least one receiver is in an active mode. Furthermore, in an embodiment of the invention, the electronic communication device includes at least one confirmation circuit connected to the at least one indicator and adapted to record the incoming voice message when the at least one indicator is in an active mode. The at least one confirmation circuit is adapted to play the recorded voice message and the at least one confirmation circuit sends the played voice message to the first remote device when the indicator is in a passive mode, thereby confirming the safe receipt of the voice message.

In an embodiment of the invention, the present disclosure provides a confirmation circuit adapted to be connected to a repeater having a receiver, a transmitter, a speaker connected to the receiver, a microphone connected to the transmitter, and a Light Emitting Device (LED) connected to the receiver. The LED is adapted to be powered off when the receiver is in an active mode and to be powered on when the receiver is in a passive mode. The confirmation circuit includes at least one recorder for recording the incoming voice message received at the receiver. The recorder being adapted to play back the recorded massage and comprise a speaker output adapted to output the played back recorded message. The confirmation circuit further includes a first relay connected to the at least one recorder, to the LED and to the speaker. The first relay is adapted to activate the recorder to record the incoming voice message when the receiver is in an active mode. More specifically, the first relay is adapted to activate the recorder to record the incoming voice message when the LED is powered off.

Further, in an embodiment of the invention, the confirmation circuit includes a second relay coupled to the at least one recorder, to the at least one indicator and to the microphone. The recorder comprises a speaker output for outputting the played back recorded message. The second relay is adapted to activate the at least one recorder to play the recorded message when the receiver is in a passive mode. More specifically, the second relay is adapted to activate the recorder to play the recorded voice message when the LED is powered on and to relay the played message to the microphone, which is operationally connected to the recorder speaker output for receiving an output therefrom in order to generate an outgoing voice message. At least one transmitter is connected to the at least one microphone for sending the outgoing voice message to the remote device, thereby confirming the safe receipt of the voice message.

In another aspect, the present invention provides a method for confirming safe receipt of a voice message transmitted by a remote device to a repeater having a receiver, a transmitter, a speaker connected to the receiver, a microphone connected to the transmitter, and a Light Emitting Device (LED) connected to the receiver. The method includes receiving the voice message from the remote device. After receiving the voice message, the method includes recording the voice message while the receiver is in an active mode and the recording is being done by a recorder. Further, the method includes playing the recorded message while the receiver is a passive mode, wherein the message is being played by the recorder. While playing the recorded message, the method includes transmitting the played message received to the remote device via the transmitter, thereby confirming safe receipt of the voice message.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

BRIEF DESCRIPTION OF THE DRAWINGS

The advantages and features of the present disclosure will become better understood with reference to the following detailed description and claims taken in conjunction with the accompanying drawing, in which:

Like numerals refer to like elements throughout the present disclosure.

DETAILED DESCRIPTION OF THE INVENTION

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

The terms "a" and "an" herein do not denote a limitation of quantity, but rather denote the presence of at least one of the referenced item.

The terms "having", "comprising", "including", and variations thereof signify the presence of a component which is inclusive or open-ended and does not exclude additional, unrecited elements or method steps.

The present invention provides a repeater and electronic circuit for confirming receipt of a voice message sent through a single frequency channel in walkie/talkie communication system and its usage are described with reference to FIGS. 1-5.

Figure 6:
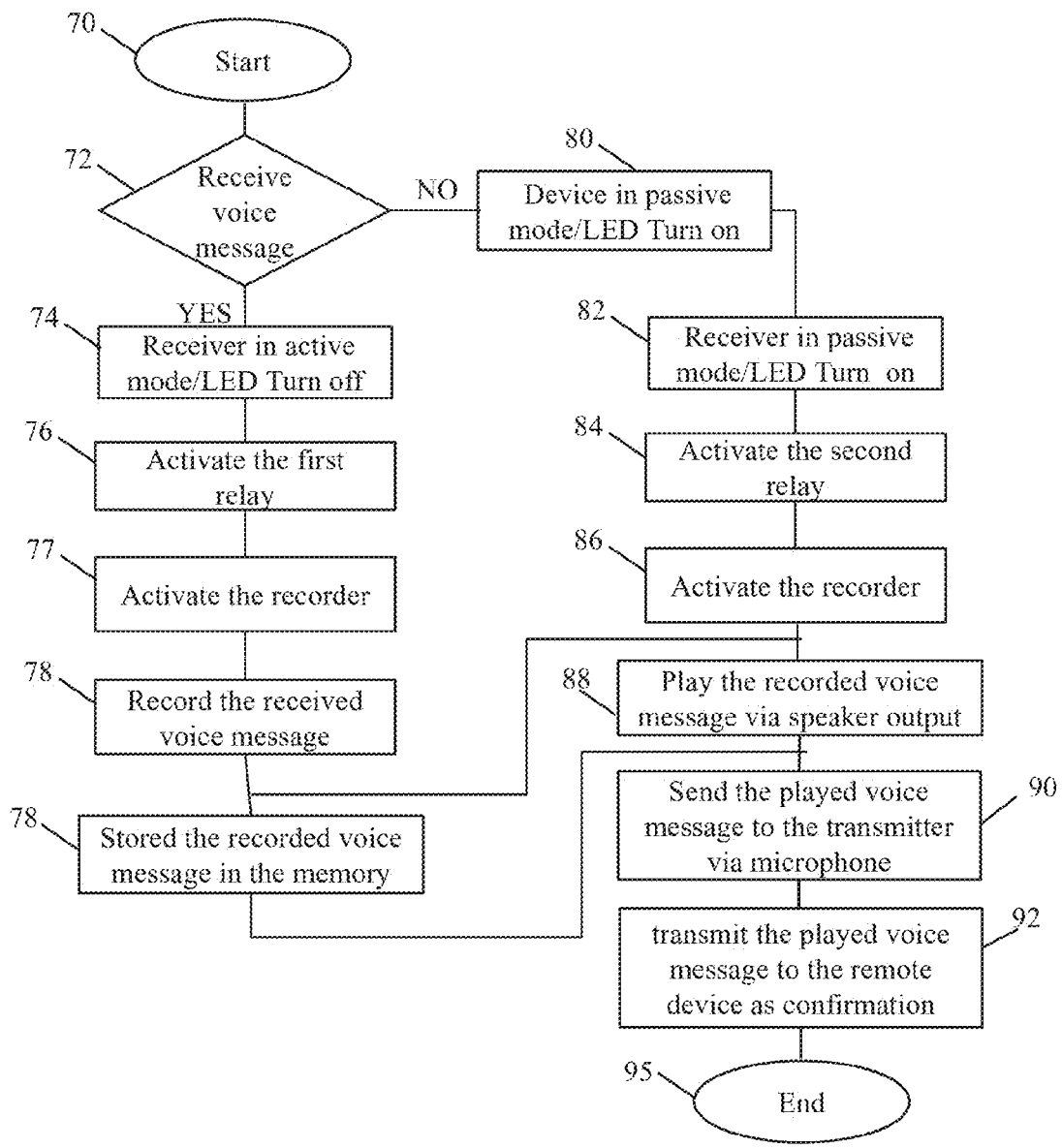
FIG. 6 illustrates a flow chart of how a confirmation receipt is sent to a remote device, according to an embodiment of the present invention.

Further, the present invention provides method for confirming safe receipt of a voice message which is shown with reference to various FIG. 6. It should be apparent to a person skilled in the art that the term "electronic communication device" as referenced herein refers to an electronic device that allows an individual to make communication with other devices, especially allowing voice communication with other devices.

Referring to FIGS. 1-5, there is shown an electronic communication device 100. The electronic communication device 100 is capable of facilitating communication between one or more remote devices or walkie/talkies 300 tuned in a same channel for voice communication via wireless communication or radio communication using radio network 600. The electronic communication device 100 as explained herein has circuitry similar to the circuitry of a known in the art repeaters, which is used in voice communication over single frequency radio networks or walkie talkie systems, and may interchangeably referred to as repeater 100. The main function of the repeater in a walkie talkie system is to receive a signal and retransmit it, preferably at a higher level or higher power, or onto the other side of an obstruction, so that the signal can cover longer distances.

The electronic communication device 100 will now be explained. In various embodiments of the present invention, the electronic communication device 100 includes circuitry similar to conventional repeater.

In one embodiment, the repeater 100 includes a receiver 110 for receiving an incoming voice message from a first remote device 300 via radio communication 600. Further, the repeater 100 includes at least one speaker (only one speaker 140 is shown) coupled to the receiver 110. The speaker 140 is configured for playing back the incoming voice message received by the receiver 110.

Furthermore, the repeater 100 includes at least one microphone (one microphone 130 is shown). Further, the repeater 100 includes at least one transmitter (one transmitter 120 is shown) coupled to the microphone 130 for sending the outgoing voice message to a second remote device 300a or 300b via the radio communication 600, or radio network 600. In this manner, the repeater 100 is able to retransmit a signal, preferably at a higher level or higher power, so that the signal can cover longer distances and reach other remote devices or walkie talkies 300.

Further, in accordance with various embodiments of the present invention, the repeater 100 further includes at least one indicator (one indicator 160 shown) coupled to the receiver 110. The indicator 160 plays a critical role in sending confirmation to the first remote device 300 about receipt of the voice message, which is explained below. The indicator 160 is adapted to provide a passive mode signal when the receiver 110 is in a passive mode, and to provide an active mode signal when the receiver 110 is in an active mode.

In an embodiment of the invention, the indicator 160 is adapted to power on when the receiver 110 is in a passive mode, and power off when the receiver 110 is in an active mode. In various embodiments, the indicator 160 may be a Light Emitting Diode (LED), a bulb, a p-n junction diode and the like. However, such examples should not be construed as a limitation to the present invention.

In one embodiment of the invention, the repeater 100 includes a delay circuit 135 for increasing the waiting time of the recorded message before being relayed to the microphone 130. Further, the microphone 130 is operationally connected to the at least one first speaker 140 via a delay circuit 135 adapted to time delay the played message before being relayed to the microphone 130 for transmission to the first remote device 300. This is in order to allow the message to be received entirely by the receiver 110 before it is being resent via the transmitter 120 back to the first remote device 300. This is because the communication channel is a unidirectional communication channel which cannot enable simultaneous bidirectional communication of messages.

Referring to FIGS. 1-5 again, in one embodiment of the present invention, the repeater 100 is adapted to receive a confirmation circuit 180. The confirmation circuit 180 is adapted to be connected to the indicator 160. The confirmation circuit 180 is adapted to record the incoming voice message when the indicator provides an active mode signal (receiver 110 is in an active mode), for example, when the LED 160 is powered off. Further, the confirmation circuit 180 is adapted to play the recorded voice message. Further, the confirmation circuit 180 is configured to send the played voice message to the first remote device 300 (which has sent the incoming message) via radio communication 600, when the indicator 160 provides a passive mode signal (receiver 110 is in a passive mode), for example when the LED 160 is powered on. As a result, the first remote device 300 gets a confirmation of the safe receipt of the voice message.

Further, in one embodiment of the present invention, the confirmation circuit 180 comprises the following components. Firstly, the confirmation circuit 180 comprises a recorder 184 having a memory to store the recorded information. The memory may be a ROM, a RAM, an EEPROM, a hard disk, a flash memory, a magnetic disk and an optical disk. However, such examples should not be construed as a limitation to the present invention. The recorder 184 comprises a speaker output 185 adapted to output the played back recorded message.

Furthermore, in one embodiment of the present invention, the confirmation circuit 180 further comprises a first relay 182 adapted to be connected to the recorder 184, to the indicator (i.e. LED 160 in this example) and to the receiver 110. Also, the confirmation circuit 180 further comprises a second relay 186 adapted to be connected to the recorder 184, to the indicator (e.g. LED 160) and to the microphone 130.

In various embodiments, the first relay 182 is adapted to activate the recorder 184 to record the incoming voice message when the receiver is in an active mode (message receiving mode). More specifically, the first relay 182 is adapted to activate the recorder 184 to record the incoming voice message when the indicator 160 provides an active mode signal (i.e. LED 160 is powered off for example).

Furthermore, the second relay 186 is adapted to be connected to the recorder 184, to the indicator or LED 160 and to the microphone 130. The second relay 186 is adapted to activate the recorder 184 to play the recorded message when the receiver 110 is in a passive mode. More specifically, the second relay 186 is adapted to activate the recorder to play the recorded voice message when the LED 160 is powered on and to relay the played message to the microphone 130.

The microphone 130 which is operationally connected to the speaker output 185 of the recorder 110 receives an output with the played back recorded message therefrom, and the transmitter 120 which is coupled to the microphone 140, sends the played recorded message to the first remote device 300. This recorded message is heard by an operator at the end of the first remote device 300, thereby confirming the safe receipt of the voice message.

In other words, by installing the confirmation circuit 180, the repeater 100 becomes enabled to send confirmation messages to the remote device 300, which has actually transmitted the incoming voice message.

More specifically, referring to FIGS. 1-5, in one embodiment of the present invention, when the remote device 300 sends a voice message to the communication device 100 (such as repeater), the receiver 110 of the repeater 100 receives the incoming voice message from the remote device 300. Thereafter, the receiver 110 goes in an active mode. The receiver 110 is adapted to power off the LED 160 in the active mode. Further, in active mode, the LED 160 is adapted to send activation signal to the first relay 182 which is coupled to the recorder 184. After receiving the activation signal, the first relay 182 is adapted to activate the recorder 184 to record the incoming voice message. Further, the recorded voice message is stored in the memory of the recorder 184.

Further, when no voice message is received at the receiver 110, the receiver 110 automatically goes into the passive mode and turns on the LED 160. Further, in such passive mode, the LED 160 is adapted to send an activation signal to the second relay 182 which is coupled to the recorder 184. After receiving the activation signal, the second relay 186 is adapted to activate the recorder 184 to play the recorded voice message and relay the played message to the microphone 130. Since the microphone 130 is operationally connected to the speaker output 185 of the recorder 110 for receiving an output therefrom, the message is received by the microphone, and the transmitter 120 which is connected to the microphone 130 sends the played voice message to the first remote device 300, confirms the safe receipt of the voice message.

Figure 1:
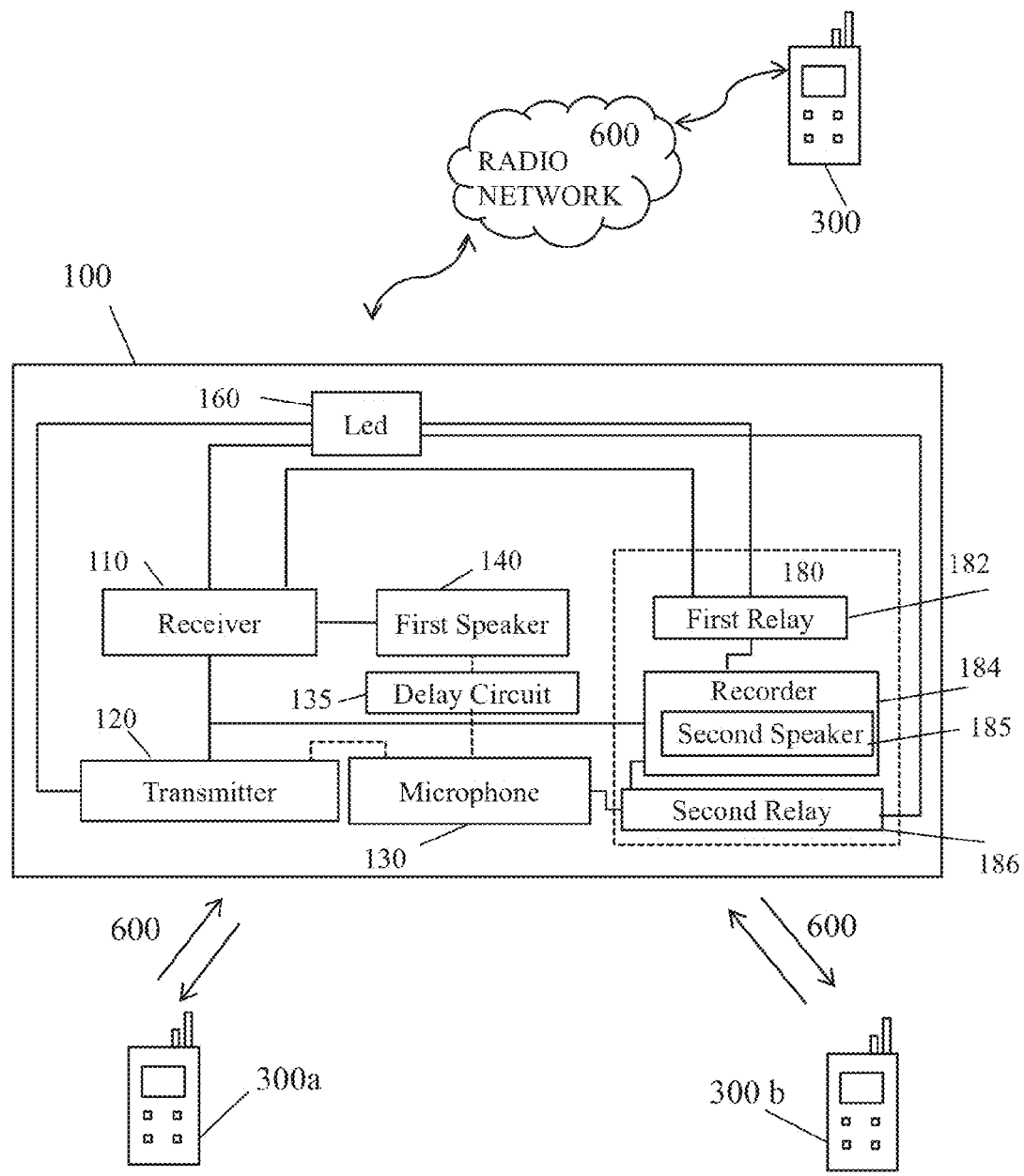
FIG. 1 illustrates a block diagram of an electronic communication device with a confirmation circuit for facilitating communication between one or more remote device, according to an embodiment of the present invention.
Figure 2:
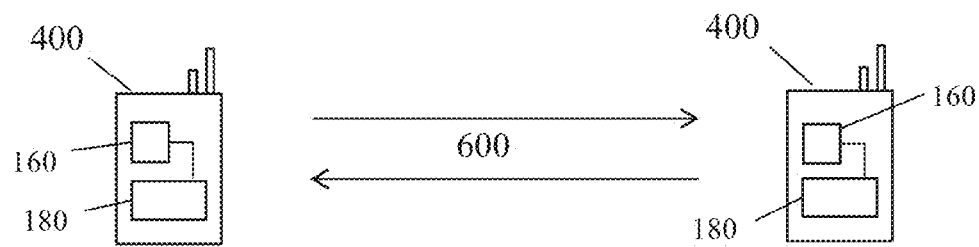
FIGS. 2-3 illustrate implementation of the confirmation circuit of the present invention with existing walkie/talkie terminals that are already known, according to an embodiment of the present invention.

Now referring to FIG. 2, there is shown another embodiment of the present invention in which the confirmation circuit 180 may be installed inside conventional remote devices or walkie talkies 400 communicating in short range communication rather than in a repeater. In this embodiment, there is shown a communication between the plurality of remote devices or walkie/talkies 400. The confirmation circuit 180 is coupled to an LED 160 and installed inside the walkie talkies 400 for providing the confirmation safe receipt of messages to each other within a short range communication via radio communication 600.

Figure 3:
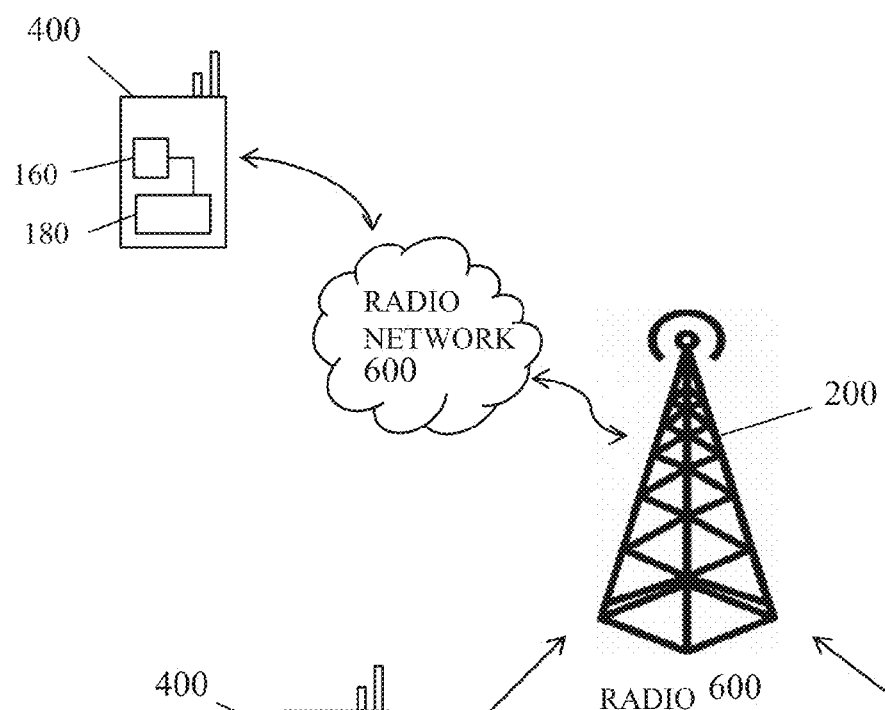
Figure 4:
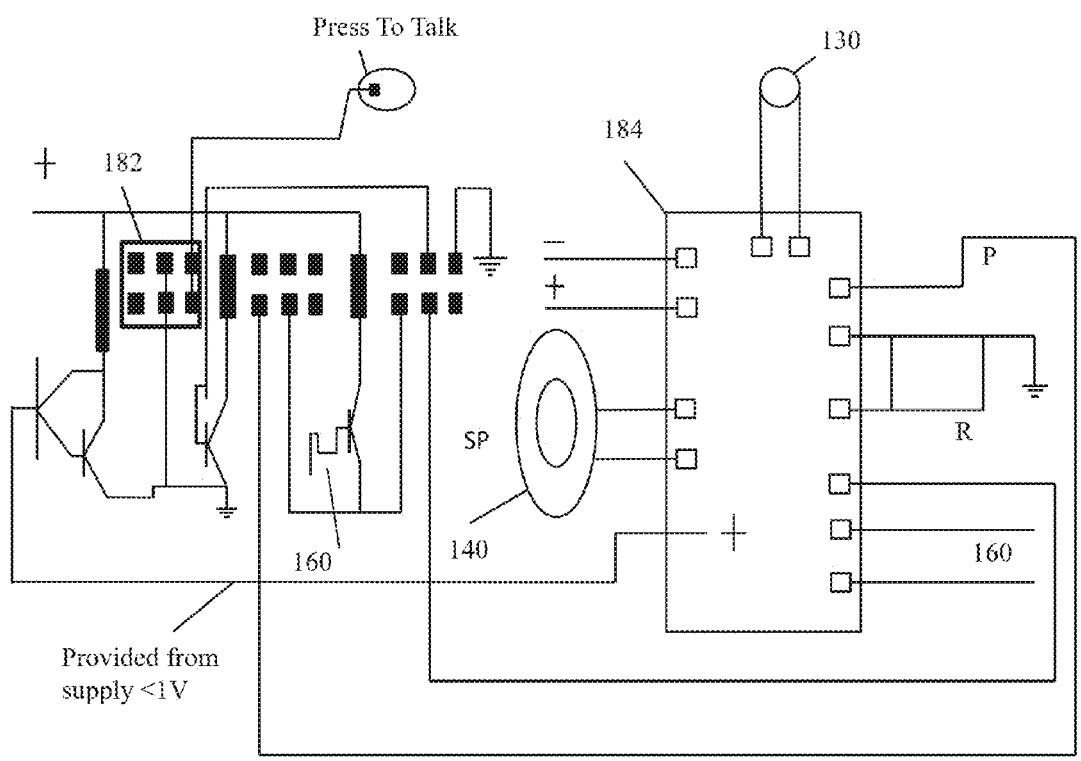
FIG. 4 illustrates a schematic electrical diagram of circuitry of the electronic communication device of FIG. 1, according to an embodiment of the present invention.
Figure 5:
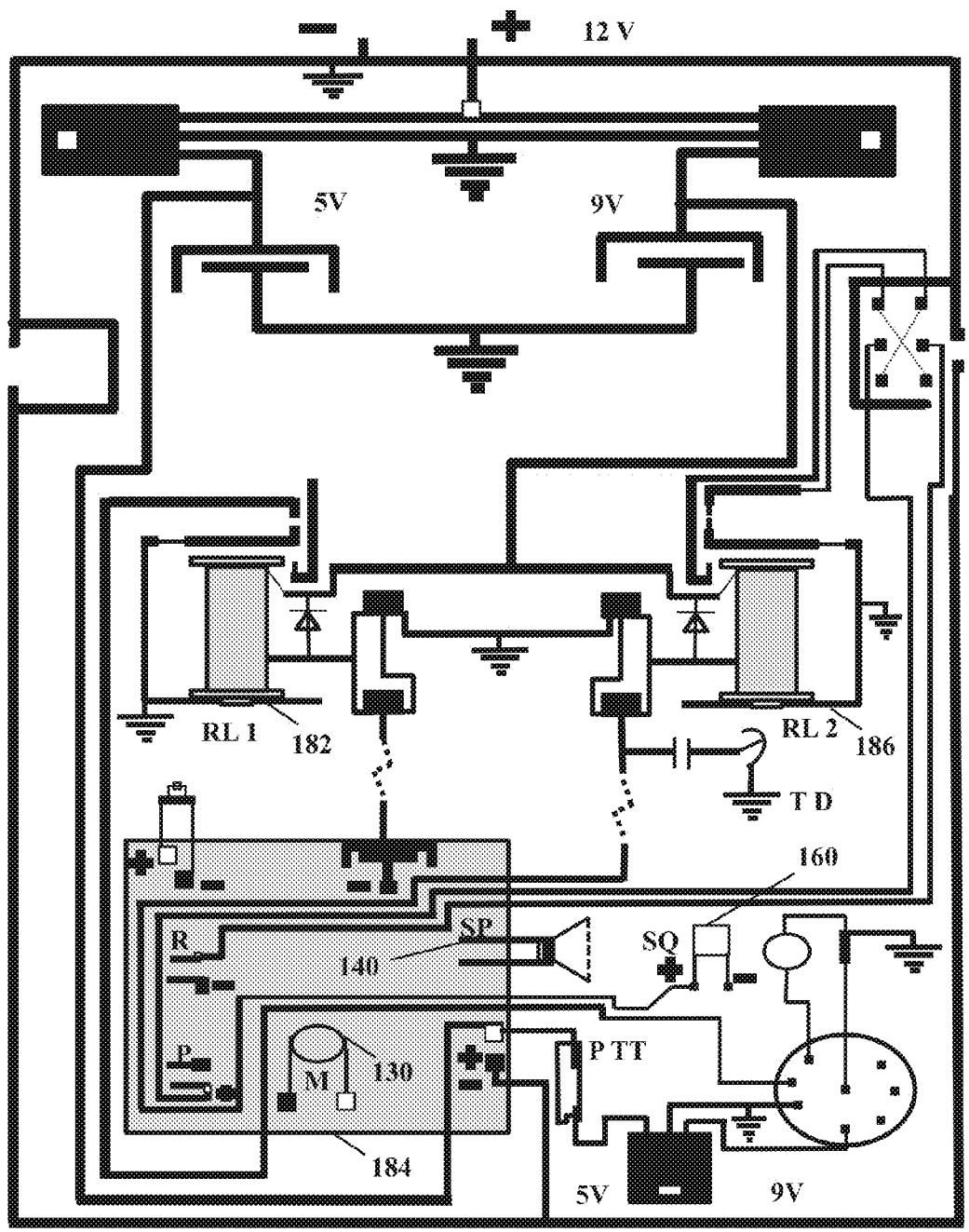
FIG. 5 illustrates a schematic diagram of the circuitry of the electronic communication device of FIG. 1, according to an embodiment of the present invention.

Referring to FIG. 3, there is shown yet another embodiment of the present invention which shows communication between the plurality of remote devices or walkie/talkies 400 in long range communication in which the confirmation circuit 180 may be installed inside conventional remote devices or walkie talkies 400. In this embodiment, the remote devices 400 include the LED 160 and the confirmation circuit 180 for providing the confirmation safe receipt to each other within a long range communication.

The confirmation circuit 180 may be adapted for the different devices depending on how the indicator (for example LED 160) is configured in these walkie talkie devices. For example, in some of these devices, the LED 160 is turned on while the device is in an active mode, while in other devices, the LED 160 is turned on while the device is in a passive mode.

Referring to FIG. 6, there is shown a detailed flow chart of how a confirmation safe receipt is sent to the remote device 300 by the repeater 100. As shown in FIG. 6, the method starts at step 70. At step 72, it is verified if the voice message is received at the receiver 110. If it is received, the receiver 110 automatically goes in an active mode, and the LED 160 gets in the active mode (LED 160 is turned off), at step 74. Further, in the active mode, the LED 160 is adapted to send activation signal to the first relay 182 and activate the first relay at step 76. After step 76, the first relay 182 is adapted to activate the recorder 184 at step 77. After activation, the recorder 184 records the incoming voice message at step 78. Further, the recorded message is stored in the memory at step 79.

In case at step 72, if it is verified if the voice message is not received at the receiver 110, therefore the receiver 110 automatically goes into the passive mode and the LED 160 is turned on, at step 80. Further, in the passive mode, the LED 160 is adapted to send activation signal to the second relay 182 and activate the second relay 182. After receiving the activation signal, the second relay 186 is adapted to activate the recorder 184, at step 86. After activation, the recorder 184 accesses the recorder memory shown in step 79. Further, the recorder 84 is adapted to play the recorded voice message and output the played back recorded message via a speaker output 185, at step 88. At the time of playing, the played voice message is relayed to the microphone 130. The microphone 130 is operationally connected to the speaker output of the recorder 184 for receiving an output in order to send the played message to the transmitter 120 via microphone at step 130, Thereafter, the transmitter 120 transmits the played message to the remote device 300, thereby confirming the safe receipt of the voice message. Further, the method end at step 95.

The electronic communication device 100, as shown and described, has many advantages. Firstly, the electronic communication device 100 is capable of sending receipt of the voice message to the user in response to the sent voice message. Secondly, the electronic communication device 100 is capable of facilitating efficient communication between one or more remote device 300 in short range as well as in long range communication. Further, the confirmation circuit of the electronic communication device 100 may be installed in existing walkie/talkie system for improving the long and short range communication without the need of any intermediate device. Moreover, the electronic communication device 100 is inexpensive to manufacture and easy to operate, and involves a simple solution to the problem of confirmation of delivery of voice messages in conventional walkie talkie systems.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

What is claimed is:

1. An electronic communication device adapted to facilitate voice communication between one or more remote devices, the electronic communication device comprising:
   a receiver for receiving an incoming voice message from a first remote device via a communication channel;
   a speaker connected to the at least one receiver for playing the incoming voice message;
   a microphone for receiving an outgoing voice message;
   a transmitter connected to the microphone for sending the outgoing voice message to a second remote device;
   an indicator connected to the receiver, the indicator adapted to:
      provide a passive mode signal when the receiver is in a passive mode, and
      provide an active mode signal when the receiver is in an active mode;
   a confirmation circuit adapted to be connected to the indicator, to the receiver, to the transmitter and to the microphone, the confirmation circuit being adapted to:
      record the incoming voice message received by the receiver when the indicator provides an active mode signal, and
      play the recorded voice message and send the played voice message via the transmitter to the first remote device thereby confirming the safe receipt of the incoming voice message when the indicator provides a passive mode signal.

2. The electronic communication device as claimed in claim 1, wherein the indicator is a Light Emitting Diode (LED).

3. The electronic communication device as claimed in claim 2 wherein the LED is adapted to turn off when the receiver is in an active mode and to be turned on when the receiver is in a passive mode, wherein the active mode signal provided by the LED consists of the LED being turned off and the passive mode signal consists of the LED being turned on.

4. The electronic communication device as claimed in claim 1, wherein the confirmation circuit comprises:
   a recorder for recording the incoming voice message,
   a first relay connected to the recorder, to the indicator and to the speaker, wherein the first relay is adapted to activate the recorder to record the incoming voice message when the receiver is in the active mode, and
   a second relay coupled to the recorder, to the indicator and to the microphone, wherein the second relay is adapted to activate the recorder to play the recorded message when the receiver is in a passive mode, and to relay the played message to the microphone.

5. The electronic communication device as claimed in claim 4, wherein the second relay is further adapted to relay the played message to the transmitter for transmission to the first remote device, thereby confirming the receipt of the incoming voice message.

6. The electronic communication device as claimed in claim 5, wherein the confirmation circuit further comprises a memory for storing the recorded message.

7. The electronic communication device as claimed in claim 6, wherein the recorder is an audio recorder.

8. The electronic communication device as claimed in claim 6, wherein the memory is at least one of a ROM, a RAM, a EEPROM, a hard disk, a flash memory, a magnetic disk and an optical disk.

9. The electronic communication device as claimed in claim 1, wherein the confirmation circuit further comprises a capacitor for imposing a delay to play back the incoming voice message after the indicator provides a passive mode signal in order to provide a sufficient time to record the entire incoming message before playing back the message.

10. The electronic communication device as claimed in claim 1 wherein the communication channel is a unidirectional radio communication channel and wherein the first remote device is a walkie talkie device.

11. A confirmation circuit adapted to be connected to a communication device comprising a receiver for receiving an incoming message through a communication channel, a transmitter, a speaker connected to the receiver for playing the incoming message, a microphone connected to the transmitter, and an indicator connected to the receiver for indicating whether the receiver is in an active mode or a passive mode, the confirmation circuit comprising:
  a recorder for recording the incoming voice message sent by a remote device received at the receiver;
  a first relay connected to the recorder, to the indicator and to the speaker, the first relay being adapted to activate the recorder to record the incoming voice message when the receiver is in an active mode; and
  a second relay connected to the recorder, to the indicator and to the microphone, the second relay being adapted to activate the recorder to play the recorded message when the receiver is in a passive mode, and to relay the played message to the microphone.

12. The confirmation circuit as claimed in claim 10 wherein the communication device is a repeater.

13. The confirmation circuit as claimed in claim 11 wherein the indicator is a Light Emitting Device (LED) adapted to turn off when the receiver is in an active mode and to be turned on when the receiver is in a passive mode.

14. The confirmation circuit as claimed in claim 9, wherein the second relay is further adapted to relay the played message to the transmitter for transmission to the remote device, thereby confirming the receipt of the incoming voice message.

15. The confirmation circuit as claimed in claim 9 further comprising a memory for storing the recorded message.

16. The confirmation circuit as claimed in claim 9, wherein the recorder is an audio recorder.

17. The confirmation circuit as claimed in claim 14, wherein the memory is at least one of a ROM, a RAM, a EEPROM, a hard disk, a flash memory, a magnetic disk and an optical disk.

18. The confirmation circuit as claimed in claim 9 wherein the communication channel is unidirectional radio communication channel and wherein the remote device is a walkie talkie device.

19. A method for confirming safe receipt of a voice message transmitted by a remote device to a communication device via a communication channel, the communication device comprising a receiver, a transmitter, a speaker connected to the receiver, a microphone connected to the transmitter, and an indicator connected to the receiver adapted to indicate whether the receiver is in a passive mode or in an active mode, the method comprising:
  receiving the voice message from the remote device, the voice message being received by the receiver;
  recording the voice message while the receiver is in an active mode, the recording being done by a recorder;
  playing the recorded message while the receiver is a passive mode; and
  transmitting the played message to the remote device via the transmitter, thereby confirming safe receipt of the voice message.

20. The method as claimed in claim 19 further comprising relaying the message played by the recorder to the microphone connected to the transmitter for transmission by the transmitter.

21. The method as claimed in claim 19 wherein the communication device is a repeater.

22. The method as claimed in claim 21 wherein the indicator is a Light Emitting Device (LED) adapted to be turned off when the receiver is in an active mode and to be turned on when the receiver is in a passive mode.

23. The method as claimed in claim 19 wherein the communication channel is unidirectional radio communication channel and wherein the remote device is a walkie talkie device.

* * * * *